US011238770B2

(12) United States Patent
Wang et al.

(10) Patent No.: US 11,238,770 B2
(45) Date of Patent: Feb. 1, 2022

(54) DISPLAY SCREEN MODULE AND DISPLAY SCREEN

(71) Applicant: LEYARD VTEAM (SHENZHEN) CO., LTD, Shenzhen (CN)

(72) Inventors: Shenghe Wang, Shenzhen (CN); Wen Lin, Shenzhen (CN); Zhenlong Li, Shenzhen (CN); Dacheng An, Shenzhen (CN); Guoshi Yang, Shenzhen (CN); Azhen Chu, Shenzhen (CN); Wei Liu, Shenzhen (CN); Xiaohong Zou, Shenzhen (CN); Junfeng Yang, Shenzhen (CN)

(73) Assignee: LEYARD VTEAM (SHENZHEN) CO., LTD, Shenzhen (CN)

( * ) Notice: Subject to any disclaimer, the term of this patent is extended or adjusted under 35 U.S.C. 154(b) by 158 days.

(21) Appl. No.: 16/662,064

(22) Filed: Oct. 24, 2019

(65) Prior Publication Data

US 2020/0135083 A1    Apr. 30, 2020

(30) Foreign Application Priority Data

Oct. 25, 2018  (CN) .......................... 201811248979.9
Oct. 25, 2018  (CN) .......................... 201811248982.0
Oct. 25, 2018  (CN) .......................... 201811251646.1

(51) Int. Cl.
  *G09G 3/20*    (2006.01)
(52) U.S. Cl.
  CPC ..................................... *G09G 3/20* (2013.01)

(58) Field of Classification Search
  None
  See application file for complete search history.

(56) References Cited

U.S. PATENT DOCUMENTS

| 2013/0194500 A1* | 8/2013 | Na | .......................... H04N 5/44 |
| | | | 348/553 |
| 2014/0259634 A1* | 9/2014 | Cox | ...................... G09F 19/228 |
| | | | 29/592.1 |

(Continued)

FOREIGN PATENT DOCUMENTS

| CN | 202025492 U |   | 11/2011 |
| CN | 102968933 | * | 3/2013 |

(Continued)

*Primary Examiner* — Patrick N Edouard
*Assistant Examiner* — Peijie Shen
(74) *Attorney, Agent, or Firm* — Gang Yu

(57) ABSTRACT

Present disclosure discloses a display screen module and a display screen, which includes a front panel, a rear panel and a circuit module. The circuit module includes a driving device, a plurality of display assemblies and a substrate located between the front panel and the rear panel. The substrate includes a first mounting plate and second mounting plate which are integrated. The second mounting plate is formed by extension from one end of the first mounting plate along a horizontal direction. Each of the plurality of display assemblies includes a plurality of lamp beads provided at intervals on the substrate along an extension direction of the second mounting plate and facing the front panel. The driving device is arranged on the first mounting plate and partially protrudes from the rear panel. A size of the driving device is less than or equal to a size of the first mounting plate.

13 Claims, 6 Drawing Sheets

(56) References Cited

U.S. PATENT DOCUMENTS

2015/0153608 A1* 6/2015 Kondoh .............. G02F 1/13452
                                                          349/58
2018/0174498 A1* 6/2018 Hall .......................... G09G 3/32
2018/0366080 A1* 12/2018 Chen ........................ G09G 5/38
2019/0206330 A1* 7/2019 Kim ........................ G06F 3/044

FOREIGN PATENT DOCUMENTS

| CN | 102968933 A | | 3/2013 |
|----|-------------|---|--------|
| CN | 203115663 U | | 8/2013 |
| CN | 206741851 | * | 8/2013 |
| CN | 103544897 | * | 1/2014 |
| CN | 103544897 A | | 1/2014 |
| CN | 104064124 | * | 9/2014 |
| CN | 104064124 A | | 9/2014 |
| CN | 206741851 U | | 12/2017 |
| CN | 107680501 A | | 2/2018 |
| CN | 107680501 | * | 9/2018 |
| CN | 207818112 U | | 9/2018 |
| CN | 207966361 U | | 10/2018 |
| CN | 110383367 A | | 10/2019 |
| JP | 2001306013 A | | 11/2001 |
| JP | 2003108567 | * | 4/2003 |
| WO | 2007130942 A1 | | 11/2007 |

\* cited by examiner

DISPLAY SCREEN MODULE AND DISPLAY SCREEN

CROSS-REFERENCE TO RELATED APPLICATION(S)

The present disclosure claims priority of Chinese Patent Application No. 201811248982.0, Chinese Patent Application No 201811248979.9, and Chinese Patent Application No 201811251646.1, all filed on Oct. 25, 2018, the contents of which are hereby incorporated by reference in its entirety.

TECHNICAL FIELD

The disclosure relates to a field of electronic devices, and particularly to a display screen module and a display screen.

BACKGROUND

For an existing display screen module, a controller controlling power and signals is usually arranged on a back surface of the display screen module, which causes relatively large size and inconvenience for maintenance.

SUMMARY

Some embodiments of the present disclosure provide a display screen module, to solve the problem that an existing display screen module is relatively large in size and inconvenient to maintain.

Some embodiments of the disclosure are achieved by the following solution.

A display screen module includes a front panel, a rear panel and a circuit module. The circuit module includes a driving device, a plurality of display assemblies and a substrate located between the front panel and the rear panel. The substrate includes a first mounting plate and a second mounting plate which are integrated. The second mounting plate is formed by extension from one end of the first mounting plate along a horizontal direction. Each of the plurality of display assemblies include a plurality of lamp beads provided at intervals on the substrate along an extension direction of the second mounting plate and facing the front panel. The driving device is provided on the first mounting plate and partially protrudes from the rear panel. A size of the driving device is less than or equal to a size of the first mounting plate. The driving device is configured to supply power to the each of the plurality of display assemblies and provides a driving signal driving the plurality of lamp beads to work.

In an exemplary embodiment, an area of the second mounting plate is 25 times an area of the first mounting plate.

In an exemplary embodiment, the first mounting plate is of strip-type, and the second mounting plate is of rectangularly blocky.

In an exemplary embodiment, the first mounting plate includes a first edge and a second edge which are connected with each other, the second mounting plate includes a third edge and a fourth edge which are connected with each other, the second edge is matched with the third edge, and the fourth edge is 25 times the first edge.

In an exemplary embodiment, the driving device includes a housing and a plurality of controllers, the plurality of display assemblies are electrically connected with the plurality of controllers in a one-to-one correspondence manner, and the housing covers the plurality of controllers and is fixed on the rear panel.

In an exemplary embodiment, each of the plurality of controllers includes a control chip, a control circuit and a plug-in assembly, and the controller chip is electrically connected with the control circuit by the plug-in assembly.

In an exemplary embodiment, the driving device further includes a master control board, a plurality of control chips in the plurality of controllers are provided on the master control board, and the control circuit is provided on the substrate.

In an exemplary embodiment, the plug-in assembly includes a plug provided on the substrate and a socket provided on the master control board.

In an exemplary embodiment, the driving device further includes a receiving card provided on the master control board and electrically connected with the plurality of control chips, and the each of the plurality of controllers is configured to receive a display signal of the receiving card and convert the display signal into a voltage signal and a driving signal.

In an exemplary embodiment, the receiving card is arranged on a side, far away from the plurality of control chips, of the master control board.

In an exemplary embodiment, the second mounting plate includes a plurality of lamp panels formed by extension from one side of the first mounting plate respectively, wherein the plurality of lamp panels are provided at intervals.

In an exemplary embodiment, the plurality of display assemblies and the driving device are arranged on two opposite surfaces of the substrate.

Some embodiments of the present disclosure provide a display screen, the display screen includes a plurality of display screen modules connected with one another, the plurality of display screen modules being spliced into the display screen according to a preset arrangement manner, wherein the display screen module is the above mentioned display screen module.

In an exemplary embodiment, the each of the plurality of display screen modules is provided with a magnet and a connection assembly, the plurality of display screen modules are arranged in a plurality of rows and a plurality of columns, the display screen modules in two adjacent columns are connected by attraction of the magnets, and the display screen modules in two adjacent rows are connected through the connection assemblies.

In an exemplary embodiment, the connection assembly comprises a buckling piece arranged on the rear panel and a connecting piece connected with the buckling piece in a buckling manner, and the connecting piece is configured to connect an upper and lower display screen modules.

In an exemplary embodiment, the connection assembly further comprises positioning pieces arranged at two ends of the buckling piece.

Compared with the related art, the disclosure has the beneficial effects that the substrate includes the first mounting plate and second mounting plate which are integrated, the driving device is provided on the first mounting plate and partially protrudes from the rear panel, and the size of the driving device is less than or equal to the size of the first mounting plate, so that influence of the driving device on a thickness of the display screen module is avoided, and relatively small size and convenience for maintenance are ensured.

Figure 1:
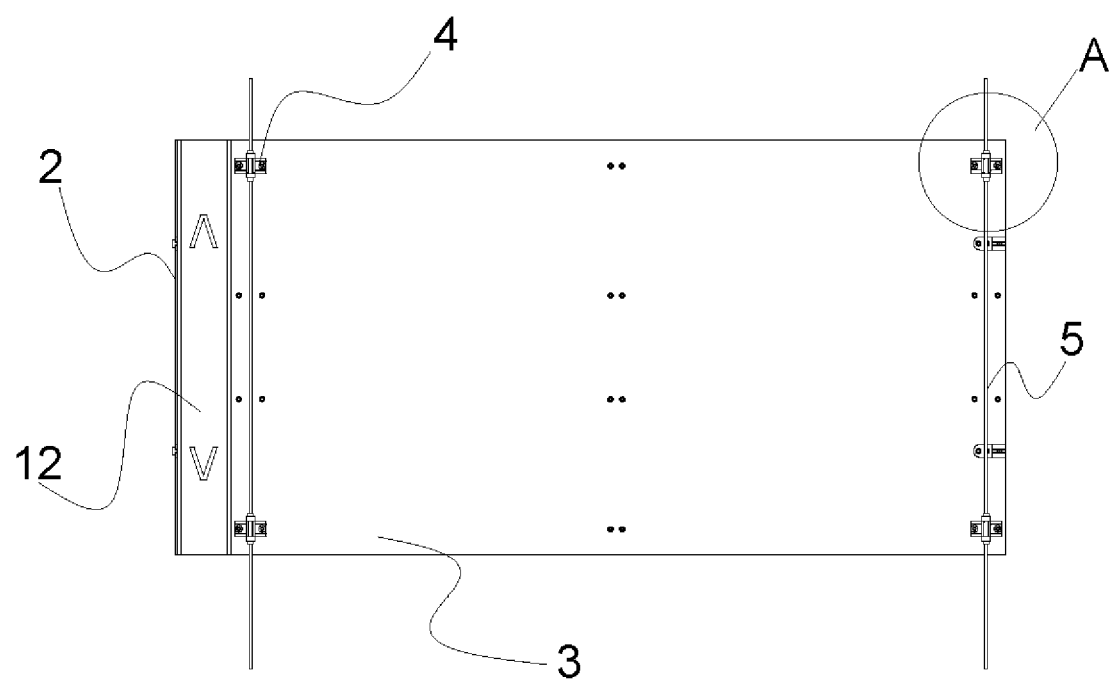
FIG. 1 illustrates a schematic diagram of a display screen module according to an embodiment of the disclosure.
Figure 2:
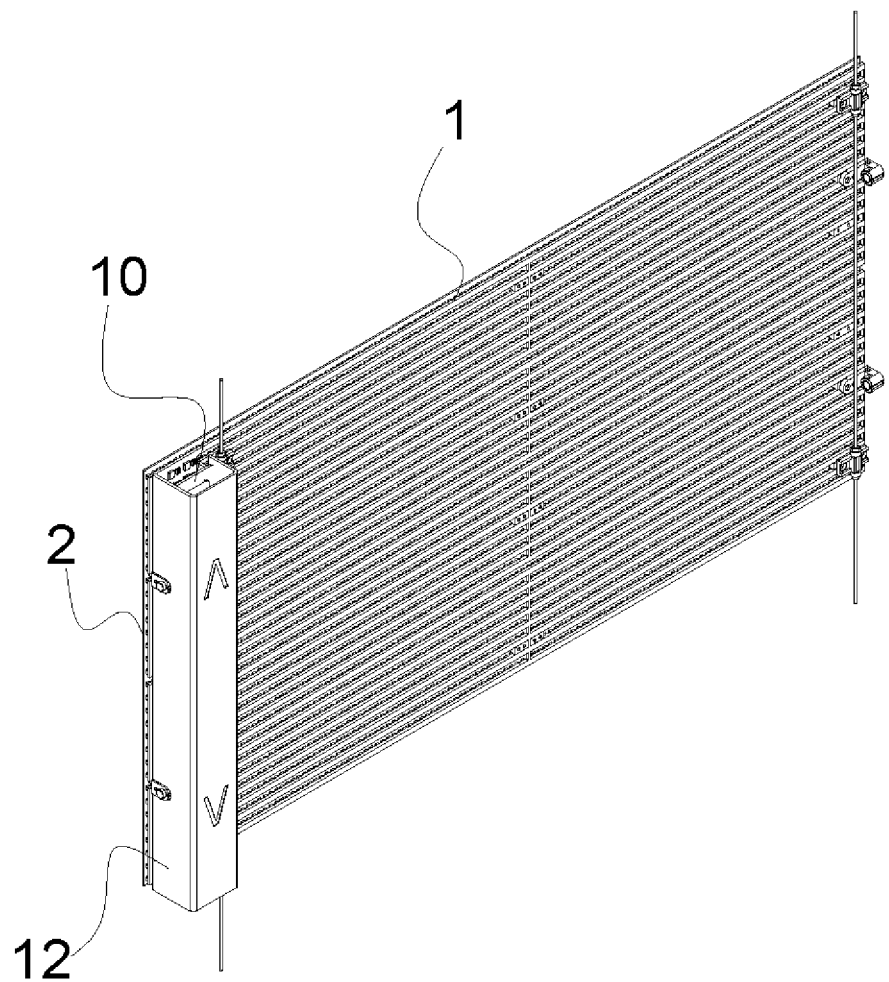
FIG. 2 illustrates a schematic diagram of a circuit module according to an embodiment of the disclosure.
Figure 3:
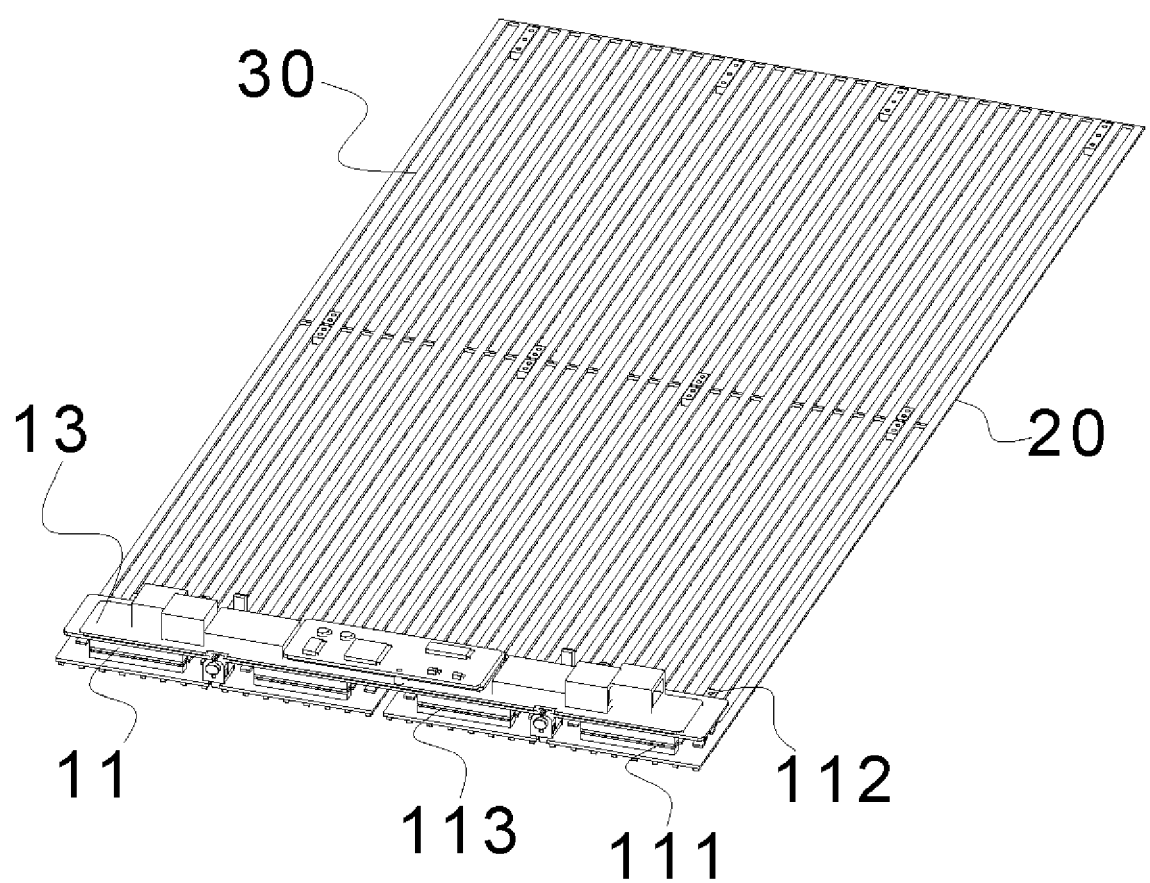
FIG. 3 illustrates an inside schematic diagram of a circuit module according to an embodiment of the disclosure.

In the drawings: 100, display screen module; 1, circuit module; 10, driving device; 11, controller; 111, control chip; 112, control circuit; 113, plug-in assembly; 1131, plug; 1132, socket; 12, housing; 13, master control board; 14, receiving card; 20, display assembly; 21, lamp bead; 30, substrate; 31, first mounting plate; 311, first edge; 312, second edge; 32, second mounting plate; 321, third edge; 322, fourth edge; 323, lamp panel; 2, front panel; 3, rear panel; 4, magnet; 5, connection assembly; 51, buckling piece; 52, connecting piece; and 53, positioning piece.

DETAILED DESCRIPTION OF THE EMBODIMENTS

The disclosure will further be described below in combination with the drawings and specific implementation modes. It is to be noted that each embodiment described below or each technical feature may be freely combined into new embodiments without conflicts.

Embodiment 1

As shown in FIGS. 2-5, some embodiments of the present disclosure provide a circuit module 1. The circuit module 1 includes a driving device 10, a plurality of display assemblies 20 and a substrate 30. The plurality of display assemblies 20 and the driving device 10 are arranged on two surfaces of the substrate 30, the two surfaces are faced away from each other. The driving device 10 includes a plurality of controllers 11 electrically connected with the plurality of display assemblies 20 in a one-to-one correspondence manner, and each of the plurality of controllers 11 is configured to supply power to a corresponding display assembly 20 in the plurality of display assemblies and provide a driving signal controlling the corresponding display assembly 20 to work. The plurality of controllers 11 and the plurality of display assemblies 20 are electrically connected in the one-to-one correspondence manner, and are arranged on the two opposite surfaces of the substrate 30, so that reliable connection of power and signals of each display assembly 20 is ensured, reliability of the whole circuit module is improved, and convenience for maintenance is ensured.

In an exemplary embodiment, the driving device 10 further includes a receiving card 14 arranged on the master control board 13 and electrically connected with the plurality of control chips 111, the receiving card 14 is arranged on a side, far away from the plurality of control chips 111, of the master control board 13, and the each of the plurality of controllers 11 is configured to receive a display signal of the receiving card 14 and convert the display signal into a voltage signal and a driving signal.

Figure 4:
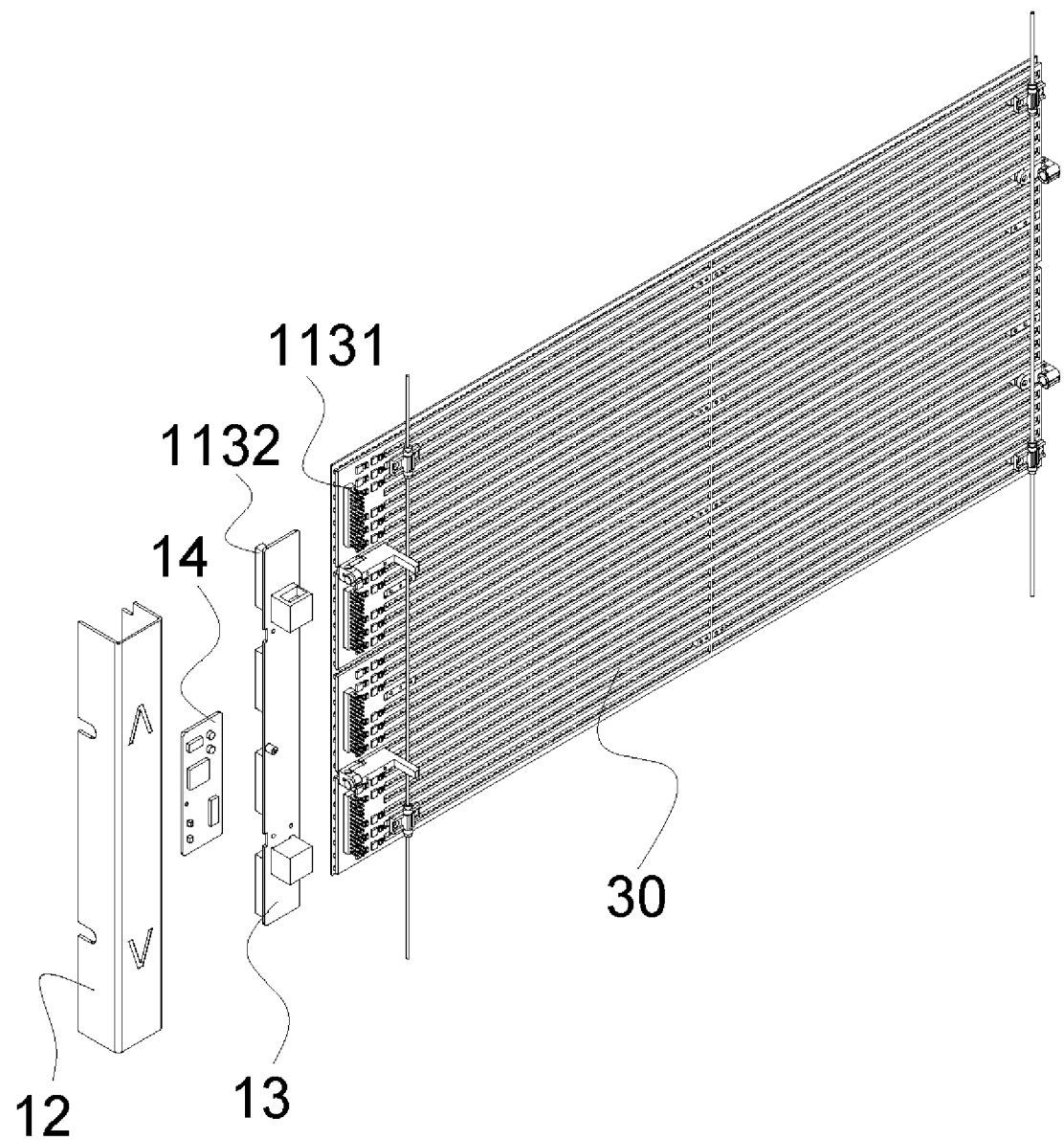
FIG. 4 illustrates an exploded view of a circuit module according to an embodiment of the disclosure.
Figure 5:
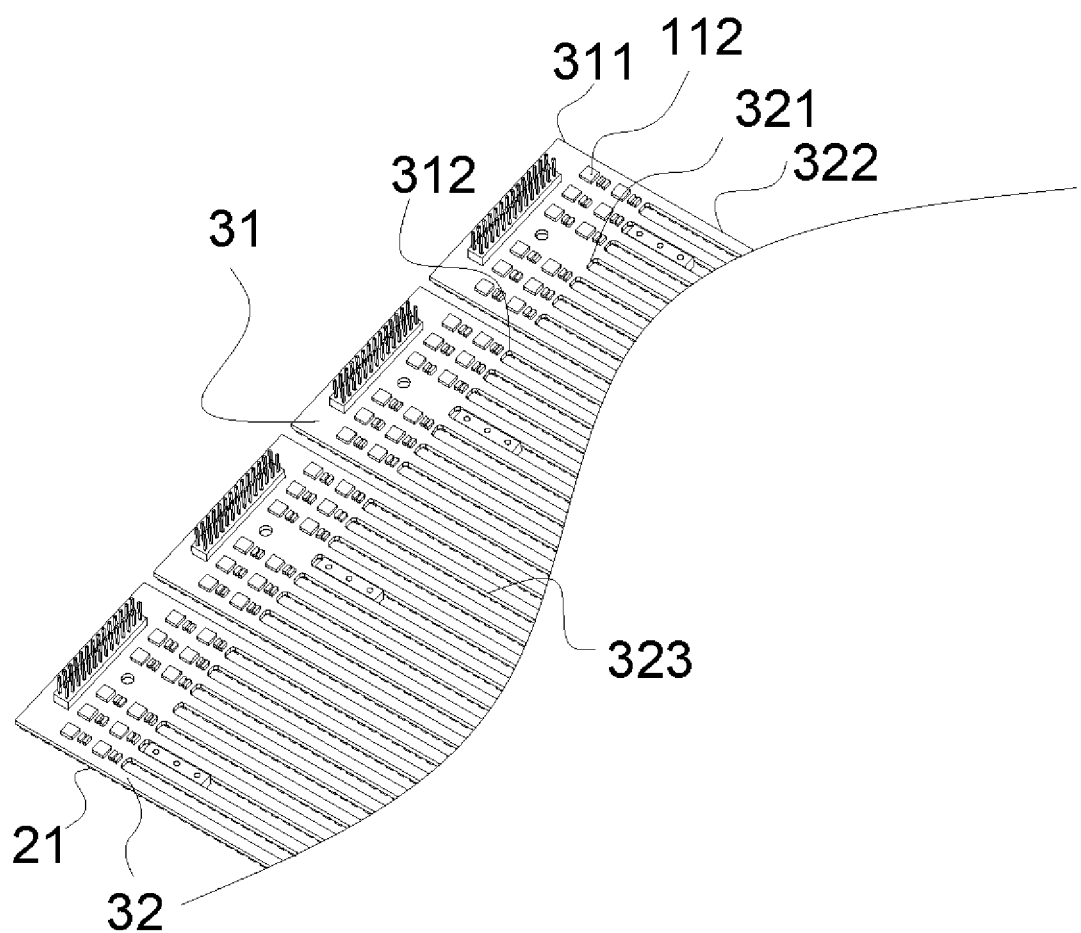
FIG. 5 illustrates a schematic diagram of a substrate according to an embodiment of the disclosure.

As shown in FIGS. 4-5, the substrate 30 includes a first mounting plate 31 and second mounting plate 32 which are integrated, the second mounting plate 32 is formed by extension from one end of the first mounting plate 31 along a horizontal direction, and each display assembly 20 includes a plurality of lamp beads 21 arranged at intervals on the substrate 30 along an extension direction of the second mounting plate 32 and facing a front panel 2.

In an exemplary embodiment, the second mounting plate 32 includes a plurality of lamp panels 323 formed by extension from one side of the first mounting plate 31 respectively, the lamp panels 323 are provided at intervals, so that the second mounting plate 32 is of a hollow structure, and the weight of the display screen module 100 is further reduced.

As shown in FIG. 1, an embodiment of the disclosure also provides a display screen module, which includes a front panel 2, a rear panel 3 and the abovementioned circuit module 1. A driving device 10 is arranged on a first mounting plate 31 and a part of the driving device 10 protrudes from the rear panel 3, thereby avoiding influence of the driving device 10 on a thickness of the display screen module 100.

Figure 6:
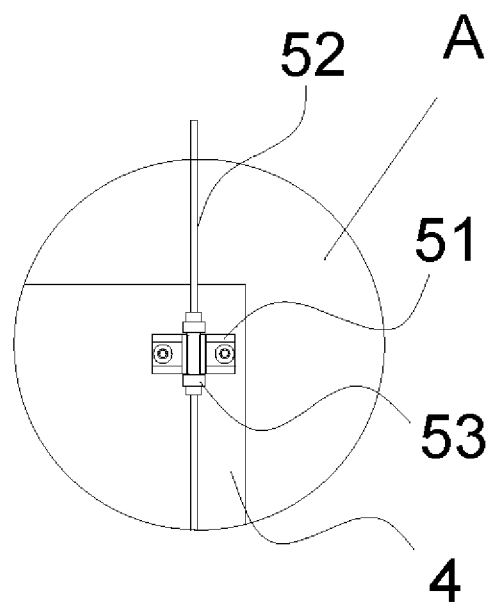
FIG. 6 illustrates an enlarged view of part A in FIG. 1.
Figure 7:
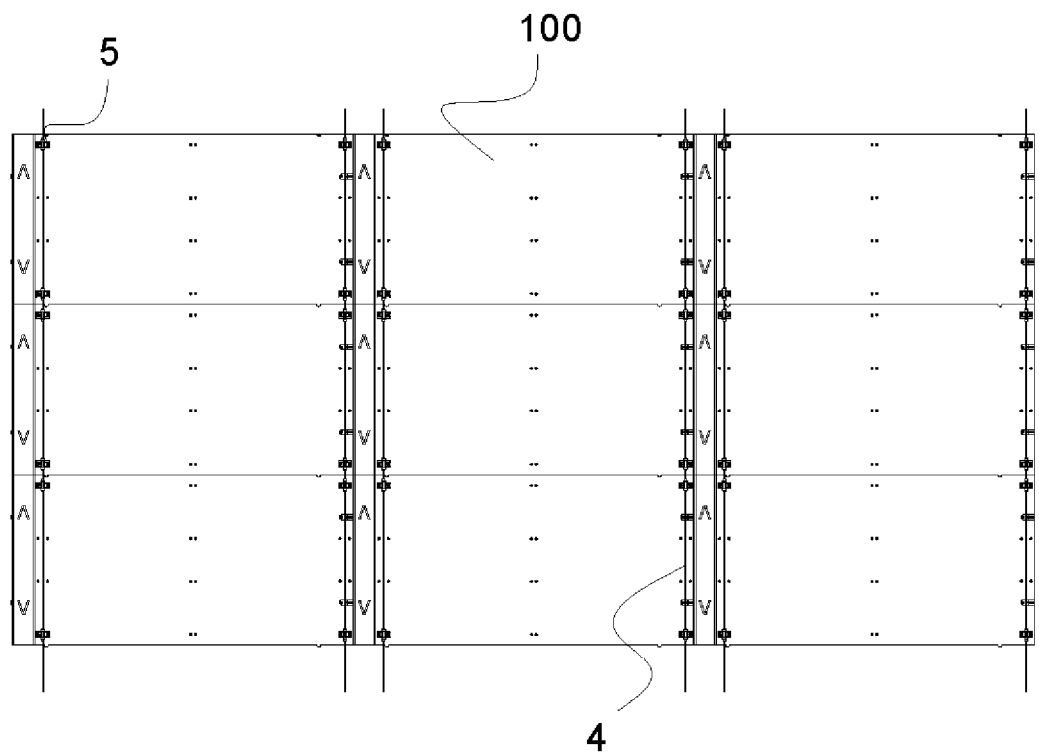
FIG. 7 illustrates a schematic diagram of a display screen.

As shown in FIGS. 6-7, a magnet 4 and a connection assembly 5 are arranged on each display screen module 100, a plurality of display screen modules 100 are arranged in multiple rows and multiple columns to form a display screen, the display screen modules 100 in two adjacent columns are connected by attraction of the magnets 4, and the display screen modules 100 in two adjacent rows are connected by the connection assemblies 5, so that firm connection between each display screen module 100 is ensured.

Other Embodiments

As shown in FIGS. 1-5, a display screen module 100 provided in an embodiment of the disclosure includes a front panel 2, a rear panel 3 and a circuit module 1. The circuit module 1 includes a driving device 10, a plurality of display assemblies 20 and a substrate 30 located between the front panel 2 and the rear panel 3. The substrate 30 includes a first mounting plate 31 and a second mounting plate 32 which are integrated. The second mounting plate 32 is formed by extension from one end of the first mounting plate 31 along a horizontal direction. Each of the plurality of display assemblies 20 includes a plurality of lamp beads 21 provided at intervals on the substrate 30 along an extension direction of the second mounting plate 32 and facing the front panel 2. The driving device 10 is provided on the first mounting plate 31 and partially protrudes from the rear panel 3. A size of the driving device 10 is less than or equal to a size of the first mounting plate 31. The driving device 10 is configured to supply power to the each of the plurality of display assemblies 20 and provides a driving signal to drive the plurality of lamp beads to work. The driving device 10 is provided on the first mounting plate 31 and partially protrudes from the rear panel 3, so that influence on a thickness of the display screen module 100 is avoided. The size of the driving device 10 is less than or equal to the size of the first mounting plate 31, that is, the driving device 10 is provided on one side of the display screen module 100, so that it is ensured that the display screen module 100 is relatively small in size and convenient to maintain.

In an exemplary embodiment, an area of the second mounting plate 32 is 25 times an area of the first mounting plate 31. The first mounting plate 31 is of strip-type, and the second mounting plate 32 is of rectangularly blocky. The first mounting plate 31 includes a first edge 311 and a second edge 312 which are connected with each other, the second mounting plate 32 includes a third edge 321 and a fourth edge 322 which are connected with each other, the second edge 312 is matched with the third edge 321, and the fourth edge 322 is 25 times the first edge 311.

In an exemplary embodiment, the second mounting plate 32 includes a plurality of lamp panels 323 formed by extension from one side of the first mounting plate 31 respectively, the plurality of lamp panels are provided at intervals, so that the second mounting plate 32 is of a hollow structure, and a weight of the display screen module 100 is further reduced.

In an exemplary embodiment, as shown in FIGS. 2-5, the driving device 10 includes a housing 12 and a plurality of controllers 11, the housing 12 covers the plurality of controllers 11 and is fixed on the rear panel 3 to prevent the plurality of controllers 11 from being damaged, and the plurality of display assemblies 20 are electrically connected with the plurality of controllers 11 in a one-to-one correspondence manner. Each of the plurality of controllers 11 is configured to supply power to a corresponding display assembly 20 in the plurality of display assemblies and provide a driving signal controlling the corresponding display assembly 20 to work. The plurality of controllers 11 and the plurality of display assemblies 20 are electrically connected in the one-to-one correspondence manner, and are arranged on the two opposite surfaces of the substrate 30, so that reliable connection of power and signals of each display assembly 20 is ensured, reliability of the whole circuit module is improved, and convenience for maintenance is ensured.

As shown in FIGS. 1-3, and 7, some embodiments of the present disclosure provides a display screen, the display screen includes a plurality of display screen modules 100 connected with one another. The plurality of display screen modules 100 are spliced into the display screen according to a preset arrangement manner. Wherein, the display screen module is the above display screen module.

In some embodiments, each display screen module 100 includes one driving device 10, the driving device 10 includes the plurality of controllers 1 electrically connected with the display assemblies 20 in the one-to-one correspondence manners, and the display assemblies 20 and the corresponding controllers 11 are arranged on the two opposite surfaces of the substrate 30, so that reliable connection of a circuit is ensured, display reliability of the display screen is improved, and a single display screen module 100 is convenient to maintain.

In an exemplary embodiment, the controller 11 includes a control chip 111, a control circuit 112 and a plug-in assembly 113, and the controller chip 111 is electrically connected with the control circuit 112 by the plug-in assembly 113. The driving device 10 further includes a master control board 13, a plurality of control chips 111 in the plurality of controllers are provided on the master control board 13, and the control circuit 112 is provided on the substrate 30. The plug-in assembly 113 includes a plug 1131 provided on the substrate 30 and a socket 1132 provided on the master control board 13.

In an exemplary embodiment, the driving device 10 further includes a receiving card 14 provided on the master control board 13 and electrically connected with the plurality of control chips 111, the receiving card 14 is provided on a side, far away from the plurality of control chips 111, of the master control board 13, and the each of the plurality of controllers 11 is configured to receive a display signal of the receiving card 14 and convert the display signal into a voltage signal and a driving signal.

As shown in FIGS. 6-7, each display screen module 100 is provided with a magnet 4 and a connection assembly 5, a plurality of display screen modules 100 are arranged in a plurality of rows and a plurality of columns to form a display screen, two adjacent columns in the plurality of columns of the display screen modules 100 are connected by attraction of the magnets 4, and two adjacent rows display screen modules 100 in the plurality of rows of the display screen modules 100 are connected by the connection assemblies 5, so that firm connection between display screen modules 100 is ensured.

In an exemplary embodiment, the connection assembly 5 includes a buckling piece 51 provided on a rear panel 3 and a connecting piece 52 connected with the buckling piece 51 in a buckling manner, and the connecting piece 52 is configured to connect the corresponding upper and lower display screen modules 100 (i.e. connect the display screen modules 100 of two adjacent rows). In an exemplary embodiment, the connection assembly 5 further includes positioning pieces 53 arranged at two ends of the buckling piece 51 to prevent the connecting piece 52 from being loosened.

According to the display screen module provided in the embodiment of the disclosure, the substrate 30 includes the first mounting plate 31 and second mounting plate 32 which are integrated, the driving device 10 is arranged on the first mounting plate 31 and partially protrudes from the rear panel 3 and the size of the driving device 10 is less than or equal to the size of the first mounting plate 31, so that influence of the driving device 10 on a thickness of the display screen module 100 is avoided, and relatively small size and convenience for maintenance are ensured.

The above implementation modes are only preferred implementation modes of the disclosure and not thus intended to limit the scope of protection of the disclosure. Any non-substantial variations and replacements made by those skilled in the art on the basis of the disclosure fall within the scope of protection of the disclosure.

What is claimed is:

1. A display screen module, comprising a front panel, a rear panel and a circuit module, wherein the circuit module comprises a driving device, a plurality of display assemblies and a substrate located between the front panel and the rear panel, the substrate comprises a first mounting plate and a second mounting plate which are integrated, the second mounting plate is formed by extension from one end of the first mounting plate along a horizontal direction, each of the plurality of display assemblies comprises a plurality of lamp beads provided at intervals on the substrate along an extension direction of the second mounting plate and facing the front panel, the driving device is provided on the first mounting plate and partially protrudes from the rear panel, a size of the driving device is less than or equal to a size of the first mounting plate, wherein the driving device is configured to supply power to the each of the plurality of display assemblies and provides a driving signal driving the plurality of lamp beads to work;

wherein an area of the second mounting plate is 25 times an area of the first mounting plate;

wherein the first mounting plate is of strip-type, and the second mounting plate is of rectangularly blocky type; and wherein the first mounting plate comprises a first edge and a second edge which are connected with each other, the second mounting plate comprises a third edge and a fourth edge which are connected with each other, the second edge is matched with the third edge, and a length of the fourth edge is 25 times a length of the first edge along the extension direction of the second mounting plate.

2. The display screen module as claimed in claim 1, wherein the driving device comprises a housing and a plurality of controllers, the plurality of display assemblies are electrically connected with the plurality of controllers in a one-to-one correspondence manner, and the housing covers the plurality of controllers and is fixed on the rear panel.

3. The display screen module as claimed in claim 2, wherein each of the plurality of controllers comprises a control chip, a control circuit and a plug-in assembly, and the controller chip is electrically connected with the control circuit by the plug-in assembly.

4. The display screen module as claimed in claim 3, wherein the driving device further comprises a master control board, a plurality of control chips in the plurality of controllers are provided on the master control board, and the control circuit is provided on the substrate.

5. The display screen module as claimed in claim 4, wherein the plug-in assembly comprises a plug provided on the substrate and a socket provided on the master control board.

6. The display screen module as claimed in claim 4, wherein the driving device further comprises a receiving card provided on the master control board and electrically connected with the plurality of control chips, and the each of the plurality of controllers is configured to receive a display signal of the receiving card and convert the display signal into a voltage signal and a driving signal.

7. The display screen module as claimed in claim 6, wherein the receiving card is arranged on a side, far away from the plurality of control chips, of the master control board.

8. The display screen module as claimed in claim 1, wherein the second mounting plate comprises a plurality of lamp panels formed by extension from one side of the first mounting plate respectively, wherein the plurality of lamp panels are provided at intervals.

9. The display screen module as claimed in claim 1, wherein the plurality of display assemblies and the driving device are arranged on two opposite surfaces of the substrate.

10. A display screen, comprising a plurality of display screen modules connected with one another, the plurality of display screen modules being spliced into the display screen according to a preset arrangement manner, wherein the display screen module is the display screen module as claimed in claim 1.

11. The display screen as claimed in claim 10, wherein the each of the plurality of display screen modules is provided with a magnet and a connection assembly, the plurality of display screen modules are arranged in a plurality of rows and a plurality of columns, the display screen modules in two adjacent columns are connected by attraction of the magnets, and the display screen modules in two adjacent rows are connected through the connection assemblies.

12. The display screen as claimed in claim 11, wherein the connection assembly comprises a buckling piece arranged on the rear panel and a connecting piece connected with the buckling piece in a buckling manner, and the connecting piece is configured to connect an upper and lower display screen modules.

13. The display screen as claimed in claim 12, wherein the connection assembly further comprises positioning pieces arranged at two ends of the buckling piece.

* * * * *